(12) United States Patent
Cooper, Jr.

(10) Patent No.: US 9,957,707 B1
(45) Date of Patent: May 1, 2018

(54) LIGHTED BALLOON AND FLORAL ARCH

(71) Applicant: Leroy Cooper, Jr., Aurora, CO (US)

(72) Inventor: Leroy Cooper, Jr., Aurora, CO (US)

( * ) Notice: Subject to any disclaimer, the term of this patent is extended or adjusted under 35 U.S.C. 154(b) by 0 days. days.

(21) Appl. No.: 15/382,624

(22) Filed: Dec. 17, 2016

Related U.S. Application Data

(60) Provisional application No. 62/270,456, filed on Dec. 21, 2015.

(51) Int. Cl.
*E04B 1/32* (2006.01)
*F16L 37/086* (2006.01)

(52) U.S. Cl.
CPC .............. *E04B 1/32* (2013.01); *F16L 37/086* (2013.01); *Y10S 362/806* (2013.01); *Y10T 403/32483* (2015.01); *Y10T 403/7075* (2015.01); *Y10T 403/7079* (2015.01)

(58) Field of Classification Search
CPC ............... E04B 1/32; Y10T 403/32483; Y10T 403/32467; Y10T 403/32475; Y10T 403/599; Y10T 403/32524; Y10T 403/32508; Y10T 403/7075; Y10T 403/7077; Y10T 403/7079; Y10S 362/806; F16L 37/086
USPC .............. 52/28, 86; 40/212, 217; 403/109.3; 362/219, 249.01, 278, 320, 806, 808; 285/7, 303, 305, 317, 399
See application file for complete search history.

(56) References Cited

U.S. PATENT DOCUMENTS

| | | | | | |
|---|---|---|---|---|---|
| 2,473,388 | A | * | 6/1949 | Rambo | E21B 17/046 182/178.6 |
| 3,347,575 | A | * | 10/1967 | Morris | F16B 7/105 16/429 |
| 3,695,645 | A | * | 10/1972 | Mommsen | F16L 37/144 24/581.1 |
| 3,897,622 | A | * | 8/1975 | Utahara | A01G 9/1407 29/452 |
| 4,183,691 | A | * | 1/1980 | Van Melle | F16B 2/245 403/108 |
| 4,615,402 | A | * | 10/1986 | Eisenloeffel | E21B 17/046 175/320 |
| 5,057,981 | A | * | 10/1991 | Bowen | F21S 4/20 362/219 |
| 5,353,570 | A | * | 10/1994 | Cooper, Jr. | F16M 11/22 248/27.8 |
| 5,410,458 | A | * | 4/1995 | Bell | F21V 21/0824 362/219 |

(Continued)

*Primary Examiner* — Robert Canfield
*Assistant Examiner* — Matthew J Gitlin
(74) *Attorney, Agent, or Firm* — Edwin H. Crabtree; Ramon L. Pizarro

(57) ABSTRACT

A balloon and floral arch adapted for receiving balloons and floral arrangements thereon. The arch is made up of a plurality of light weight, clear plastic, outer tubes, typically in 5 feet sections. The outer tubes are joined together end to end and formed into an arch. The arch can be 25 feet, 35 feet and greater. The outer tubes are used to receive a light weight, clear plastic inner tube with a string of LED lights. Opposite ends of the arch are attached to a pair of heavy, metal base plates for holding the arch upright on a floor surface. The string of lights can be powered by a 12 volt DC battery or a 110 AC electrical outlet. The arch can also include a remote control switch box for turning the lights on and off and starting blinking lights, fast or slow.

13 Claims, 1 Drawing Sheet

(56) References Cited

U.S. PATENT DOCUMENTS

| | | | | |
|---|---|---|---|---|
| 5,533,285 | A * | 7/1996 | Skistimas | A63H 27/10 211/89.01 |
| 5,647,660 | A * | 7/1997 | Lee | F21V 21/0824 248/156 |
| 5,863,425 | A * | 1/1999 | Herlehy | A47L 9/1427 15/1.7 |
| 6,572,243 | B2 * | 6/2003 | Liu | B32B 1/08 362/218 |
| 6,601,971 | B1 * | 8/2003 | Ko | F21V 9/08 362/219 |
| 6,655,057 | B2 * | 12/2003 | Kim | G09F 21/06 40/212 |
| 6,789,920 | B2 * | 9/2004 | Liou | F21V 21/0824 362/219 |
| 6,854,916 | B2 * | 2/2005 | Hsieh | F16B 7/105 403/109.1 |
| 6,874,924 | B1 * | 4/2005 | Hulse | G02B 6/0001 362/219 |
| 7,473,006 | B1 * | 1/2009 | Bollman | H01R 33/08 362/152 |
| 8,491,215 | B2 * | 7/2013 | Young | B25G 3/18 403/109.3 |
| 9,051,755 | B2 * | 6/2015 | Heining | E04H 12/2253 |
| 9,113,724 | B1 * | 8/2015 | Heining | E04H 12/2253 |

* cited by examiner

U.S. Patent | May 1, 2018 | US 9,957,707 B1
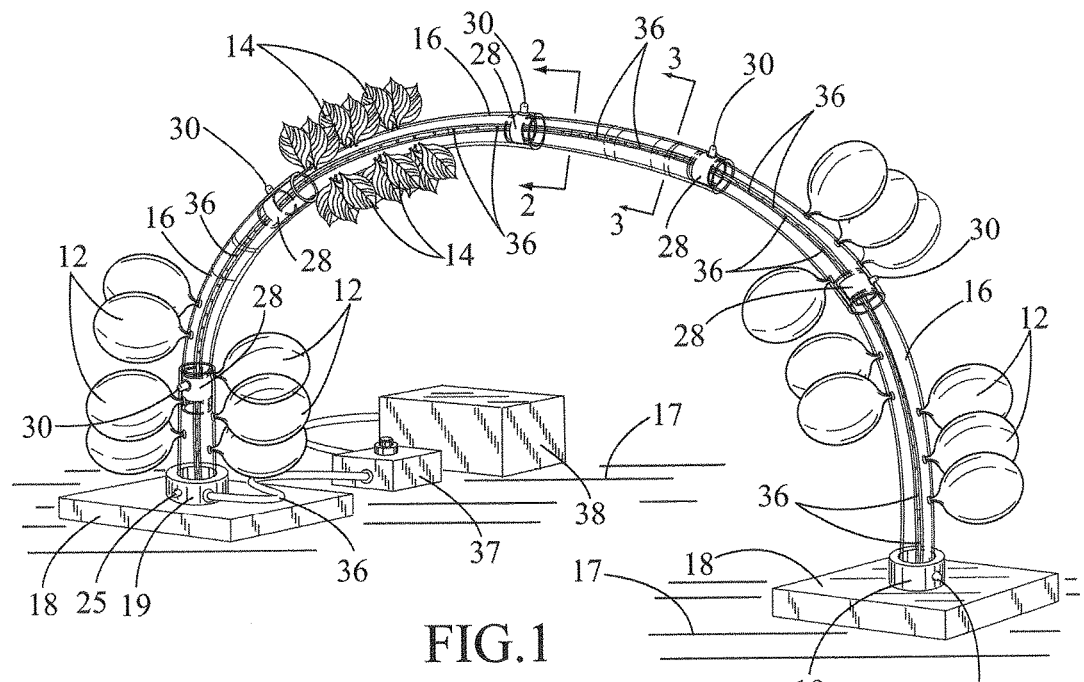
FIG.1
FIG.1A
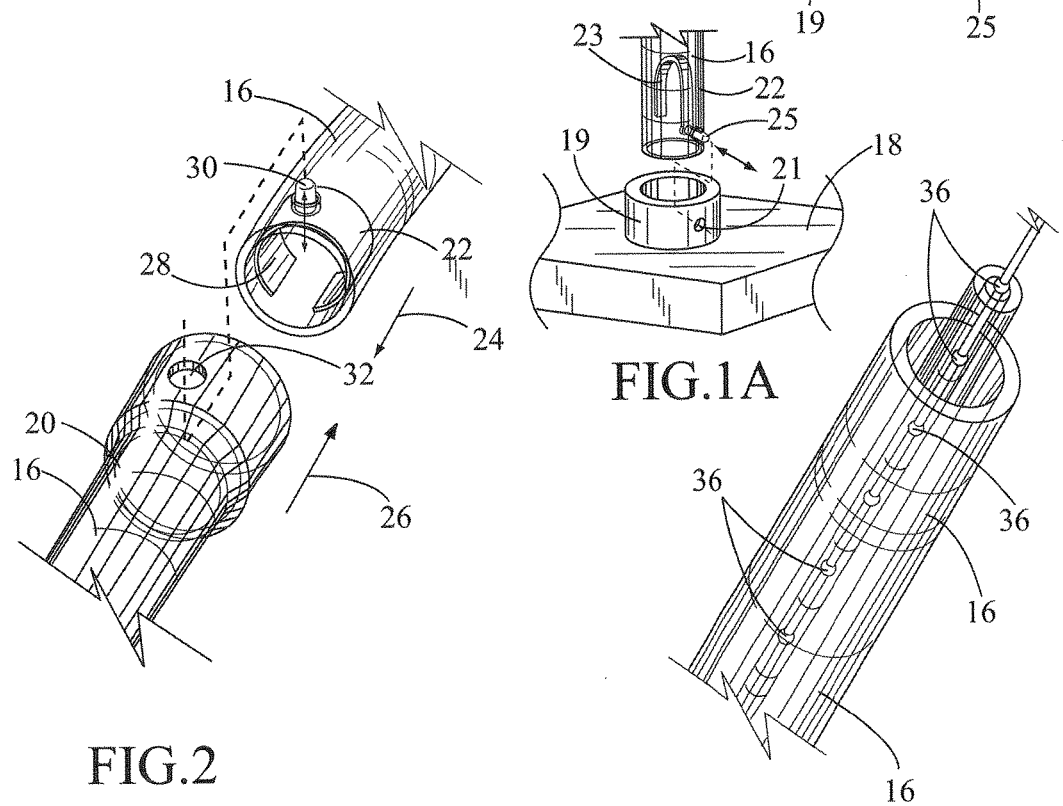
FIG.2
FIG.3

LIGHTED BALLOON AND FLORAL ARCH

This non-provisional utility patent application claims the benefit of the subject matter and the filing date of a provisional patent application Ser. No. 62/270,456, filed on Dec. 21, 2015, by the subject applicant/inventor, and having a title of "Lighted Balloon and Floral Arch".

BACKGROUND OF THE INVENTION

(a) Field of the Invention

This invention relates to a lighted balloon and floral arch and more particularly, but not by way of limitation, to a decorative, portable, lighted, balloon and floral arch used for various types of ceremonies and other occasions.

(b) Discussion of Prior Art

Heretofore, there have been a number of different types of portable arches, for example, as described in U.S. Pat. No. 5,353,570 to the subject inventor. Also, a decorative lighted arch is disclosed in U.S. Pat. No. 5,057,981 to Bowen et al. These two prior art patents don't disclose the unique features and structure when compared to the subject invention described herein.

SUMMARY OF THE INVENTION

In view of the foregoing, it is a primary objective of the subject invention to provide a unique lighted arch for ceremonies, such as weddings, birthday parties, anniversaries and like occasions.

Another object of the invention is to provide a light weight, portable arch, which can be decorated with balloons, floral arrangements, and other decorative additions.

Still another object of the arch is the use of light weight, clear PVC plastic, outer tubes which can be quickly connected for making arches 25 feet, 35 feet, and greater. The outer tubes are used to receive clear plastic, inner tubes with rope lights received therein for lighting the arch.

The subject balloon and floral arch includes a plurality of light weight, clear plastic, outer tubes, typically in 5 feet sections. The outer tubes are joined together end to end and formed into an arch. The arch can have a length of 25 feet, 35 feet and greater. The outer tubes are used to receive a light weight, clear plastic inner tube with a string of LED lights. Opposite ends of the arch are attached to a pair of heavy, metal base plates for holding the arch upright. The string of lights can be powered by a 12 volt DC battery or a 110 AC electrical outlet. The arch can also include a remote control switch box for turning the lights on and off and starting blinking lights.

These and other objects of the present invention will become apparent to those familiar with different types of decorative arches and sculptures for display when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

FIG. 1 illustrates a perspective view of the subject lighted balloon and floral arch.

FIG. 1A is a perspective view of a lower end of a plastic tube positioned for attachment to tube holder with base plate.

FIG. 2 illustrates an outer tube positioned for inserting into a swedged end of an adjacent tube.

FIG. 3 illustrates an inner tube with LED string lights received inside an outer tube.

DESCRIPTION OF THE DRAWINGS

The accompanying drawings illustrate complete preferred embodiments in the present invention according to the best modes presently devised for the practical application of the subject balloon and floral arch, and in which:

In FIG. 1, a perspective view of the subject arch is shown having a general reference numeral 10. The arch 10 is shown with balloons 12 and floral arrangements 14 mounted thereon for decorative purposes and added flair.

The arch 10 is made up of a plurality of clear plastic, outer tubes 16, typically having a 5 foot length, and joined end to end with adjacent outer tubes 16. Opposite ends of the outer tubes are received in heavy metal, base plates 18 for holding the arch 10 upright in an arch configuration on a floor surface 17. The base plates 18 can weigh from 20 to 25 pounds and can be 18 to 24 inches wide. The outer diameter of the outer tubes can be in a range of ¾ to 1 inch.

In FIG. 1A, a perspective view of a male end 22 of the plastic tube 16 is shown positioned for receipt in a tube holder 19, mounted on top of the base plate 18. The tube holder 19 includes a button hole 21. An inside of the male end 22 of the plastic tube 16 includes a spring clip 23 with button 25. When the button 25 is pushed inwardly and then released, it is received in the button hole 21 for securing the plastic tube 16 on top of the base plate 18.

In FIG. 2, a portion of one of the outer tubes 16, taken along lines 2-2 in FIG. 1, is shown. In this view, one end, or a female end 20 of the tube 16 has been swedged outwardly for receiving the male end 22 of an adjacent outer tube 16. All of the female ends 20 are swedged for receiving the male ends 22 of the tubes 16. Arrows 24 and 26 are shown indicating the male end 22 is ready for receipt inside the female end 20. A metal, spring clip 28, with a button 30, is shown attached to an inside of the male end 22. When the male end 22 is inserted inside the female end 20, the button 30 is received inside a button hole 32 in a side of the female end 20 for holding the two outer tubes 16 together, when constructing the arch 10. For proper alignment of the arch 10, all of the buttons 30 in the button holes 32 should be aligned vertically in an "up" position or a "down" position to prevent the arch from tipping.

In FIG. 3, taken along lines 3-3 shown in FIG. 1, another key feature of the arch 10 is shown using a clear plastic, inner tube 34, which is received through the outer tubes 16. The inner tube 34 is used to hold an LED string light 36 or a similar type of string light, having any number of lights thereon. The inner tube 34 can have an outer diameter in a range of ⅜ to ½ inch.

Referring back to FIG. 1, one end of the string light 36 is threaded through the tube holder 19 and connected to switch box 37. The switch box is connected to a power supply 38, such as a 12 volt DC portable battery. Also, the end of the straight light 36 can be connected to a standard 110 AC electrical outlet. The switch box 37, can be turned on and off using a remote control. The remote control is not shown in the drawings. The switch box 37 also provides for string lights 36 to blink on and off fast and slow.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

1. A balloon and floral arch adapted for receiving balloons, floral arrangements, and decorative additions thereon, the arch comprising:
   a plurality of clear plastic, outer tubes, the outer tubes joined together forming an arch configuration adapted for receipt on a floor surface;
   a plurality of circular spring clips with buttons, each clip attached to an inside of a male end of each outer tube and concentric with an inner diameter of the outer tube, the male end received inside a female end of an adjacent outer tube, the buttons received inside button holes in a side of a female end of the outer tube for securing the male end to the female end, a plurality of the buttons on the clips aligned with each other on a periphery of the outer tubes for stability and prevent tipping of the arch:
   a clear plastic, inner tube with a string of lights received therein, the inner tube and the string of light received inside the joined together outer tubes, the circular spring clips allowing the inner tube to pass unobstructed through the joined together outer tubes;
   a pair of metal base plates, the base plates having a tube holder therein for receiving opposite ends of the outer tubes joined together, the base plates and tube holders holding the arch configuration upright on the floor surface; and
   a power supply connected to the string of lights for providing electrical power to the lights.

2. The arch as described in claim 1 wherein the outer tubes are 5 feet in length.

3. The arch as described in claim 1 wherein a length of the arch is in a range of 25 feet to 35 feet.

4. The arch as described in claim 1 wherein the electrical power supply is a 12 volt DC battery or a 110 AC electrical outlet.

5. The arch as described in claim 1 wherein opposite ends of the joined together outer tubes are attached to the base plate using an inverted "U" shaped spring operated metal clip.

6. The arch as described in claim 1 further including a switch box, with remote control, attached to the power supply and to the string of lights for turning the lights on and off.

7. The arch as described in claim 1 wherein the female ends of the outer tubes are swedged for receiving the male ends of adjacent outer tubes.

8. A balloon and floral arch adapted for receiving balloons, floral arrangements, and decorative additions thereon, the arch comprising:
   a plurality of, clear plastic, outer tubes, in 5 feet sections, the outer tubes joined together forming an arch configuration adapted for receipt on a floor surface, the outer tubes having a diameter in a range of ¾ to 1 inch;
   a plurality of circular spring clips with buttons, each clip attached to an inside of a male end of each outer tube and concentric with an inner diameter of the outer tube, the male end received inside a female end of an adjacent outer tube, the buttons received inside button holes in a side of a female end of the outer tube for securing the male end to the female end, a plurality of the buttons on the clips aligned with each other on a periphery of the outer tubes for stability and prevent tipping of the arch:
   a clear plastic, inner tube with a string of lights received therein, the inner tube and the string of light received inside the joined together outer tubes, the circular spring clips allowing the inner tube to pass unobstructed through the joined together outer tubes, the inner tube having a diameter in a range of ⅜ to ½ inch;
   a pair of metal base plates, the base plates having a tube holder therein for receiving opposite ends of the outer tubes joined together, the base plates and tube holders used for holding the arch configuration upright on the floor surface; and
   a power supply connected to the string of lights for providing electrical power to the lights.

9. The arch as described in claim 8 wherein a length of the arch is in a range of 25 feet to 35 feet.

10. The arch as described in claim 8 wherein the electrical power supply is a 12 volt DC battery or a 110 AC electrical outlet.

11. The arch as described in claim 8 wherein opposite ends of the joined together outer tubes are attached to the base plate using a inverted "U" shaped spring operated metal clip.

12. The arch as described in claim 8 further including a switch box, with remote control, attached to the power supply and to the string of lights for turning the lights on and off.

13. The arch as described in claim 8 wherein the female ends of the outer tubes are swedged for receiving the male ends of adjacent outer tubes.

* * * * *